United States Patent
Takahashi et al.

(10) Patent No.: US 6,838,184 B2
(45) Date of Patent: Jan. 4, 2005

(54) AROMATIC POLYIMIDE FILM FOR ELECTRO-CONDUCTIVE SEALING ELEMENT OF PACKAGED SEMI-CONDUCTOR DEVICE

(75) Inventors: Takuji Takahashi, Yamaguchi (JP); Toshihiko Anno, Yamaguchi (JP); Kohji Narui, Yamaguchi (JP); Shozo Katsuki, Yamaguchi (JP)

(73) Assignee: Ube Industries, Ltd. (JP)

( * ) Notice: Subject to any disclaimer, the term of this patent is extended or adjusted under 35 U.S.C. 154(b) by 0 days.

(21) Appl. No.: 10/393,255

(22) Filed: Mar. 21, 2003

(65) Prior Publication Data

US 2003/0180557 A1 Sep. 25, 2003

(30) Foreign Application Priority Data

Mar. 22, 2002 (JP) ......................................... 2002-080198

(51) Int. Cl.$^7$ .......................... B32B 27/08; B32B 27/34; B32B 7/04; B32B 15/08; C08G 73/10
(52) U.S. Cl. .................... 428/473.5; 428/215; 428/216; 428/213; 428/220; 428/411.1; 428/457; 428/458; 427/532; 427/533; 427/535; 427/536; 264/176.1; 264/173.16; 264/271.1; 264/272.11; 264/272.17; 528/170; 528/353
(58) Field of Search ........................... 428/473.5, 411.1, 428/213, 215, 216, 457, 458, 219, 220; 264/272.11, 272.17, 271.1, 176.1, 173.16; 427/532–533, 535–536; 528/170, 353

(56) References Cited

U.S. PATENT DOCUMENTS

| | | | | |
|---|---|---|---|---|
| 4,731,287 A | * | 3/1988 | Noda et al. | 428/332 |
| 5,158,831 A | * | 10/1992 | Schirmer | 428/457 |
| 5,741,598 A | * | 4/1998 | Shiotani et al. | 428/458 |
| 6,129,982 A | * | 10/2000 | Yamaguchi et al. | 428/336 |
| 6,217,996 B1 | * | 4/2001 | Yamamoto et al. | 428/220 |
| 6,548,180 B2 | * | 4/2003 | Yamamoto et al. | 428/473.5 |
| 6,555,238 B2 | * | 4/2003 | Uhara et al. | 428/458 |
| 6,699,572 B2 | * | 3/2004 | Yamamoto et al. | 428/216 |
| 6,705,007 B1 | * | 3/2004 | Kurita et al. | 29/852 |
| 2001/0010860 A1 | * | 8/2001 | Yamaguchi et al. | 428/216 |

* cited by examiner

Primary Examiner—P. Hampton Hightower
(74) Attorney, Agent, or Firm—Jeffrey L. Costellia; Nixon Peabody LLP

(57) ABSTRACT

An aromatic polyimide film for producing an electro-conductive sealing element of a packaged semi-conductor device, has a thickness of 20 to 60 $\mu$m, a moisture vapor transmission coefficient of 0.05 to 0.8 g/mm/m$^2$·24 hrs, a water absorption ratio of 2.0% or less, and an elastic modulus in tension of 5,000 MPa or more, in which a surface of the polyimide film has been treated with reduced-pressure plasma discharge.

13 Claims, 1 Drawing Sheet

AROMATIC POLYIMIDE FILM FOR ELECTRO-CONDUCTIVE SEALING ELEMENT OF PACKAGED SEMI-CONDUCTOR DEVICE

FIELD OF THE INVENTION

This invention relates to an electro-conductive sealing element of a packaged semi-conductor device and particularly relates to the electro-conductive sealing element composed of an aromatic polyimide layer and a copper layer.

BACKGROUND OF THE INVENTION

In order to provide a smaller-sized semi-conductor device package, new package structures such as Ball Grid Array Package (BGA) structure and Chip Scale Package (CSP) have been proposed and employed practically. As an electro-conductive sealing element of the semi-conductor package, a composite element composed of an aromatic polyimide film and a metal film placed on the polyimide film is employed. The aromatic polyimide film should have a high dimensional stability and a low water absorption and accordingly the polyimide film is typically made of polyimide comprising a 3,3',4,4'-biphenyltetracarboxylic acid unit and a p-phenylenediamine unit.

For the manufacture of a semi-conductor device package, a semi-conductor device is connected to a circuit board of electro-conductive sealing element and sealed with resinous material. In the course of manufacture of a semi-conductor device package, moisture vapor is produced within the semi-conductor device package, and the moisture vapor has to be removed from the device package.

The aromatic polyimide film of polyimide comprising a 3,3',4,4'-biphenyltetracarboxylic acid unit and a p-phenylenediamine unit shows a small moisture vapor-transmission ratio. Accordingly, it takes a considerably long period of time for removing the moisture vapor produced in the semi-conductor device package through the sealing element.

In order to shorten the period of time required for removing the moisture vapor from the package, it has been proposed to employ an aromatic polyimide film prepared from pyromellitic dianhydride and a diamine compound. This pyromellitic acid-type polyimide film shows a relatively high moisture vapor transmission ratio, but shows a low tensile modulus. Accordingly, the aromatic polyimide film of the electro-conductive sealing element should have an increased thickness to impart enough tensile strength to the sealing element. The increased thickness of the polyimide film is disadvantageous for manufacturing a circuit board having an increased fine circuit pattern.

For preparing the electro-conductive sealing element, a copper film is placed on the polyimide film. The copper film is generally combined to the polyimide film using adhesive. However, the use of adhesive results in increase of thickness of the sealing element. The increased thickness of the sealing element is disadvantageous for manufacturing a small-sized semiconductor device package.

A sealing element in which a copper film is directly plated or deposited on the aromatic polyimide film has been already proposed and employed. Since a surface of the conventional aromatic polyimide film shows low adhesiveness, it has been proposed to apply a surface-activating treatment to the polyimide film. Examples of the surface-activating treatments include wet processes such as desmear treatment and alkaline treatment and dry processes such as atmospheric pressure plasma discharge treatment and corona discharge treatment. The wet process is disadvantageous in that sufficient washing is required. The conventional dry process cannot impart satisfactory adhesiveness to the aromatic polyimide film.

Accordingly, it is an object of the present invention to provide an electro-conductive sealing element for manufacturing a packaged semi-conductor device which requires a shortened drying period of time and particularly to provide an electro-conductive sealing element composed of an aromatic polyimide layer and a copper layer having such advantageous features.

SUMMARY OF THE INVENTION

The present invention resides in an aromatic polyimide film for producing an electro-conductive sealing element of a packaged semi-conductor device, in which the polyimide film has a thickness of 20 to 60 μm, a moisture vapor transmission coefficient of 0.05 to 0.8 g/mm/m$^2$·24 hrs, preferably 0.05 to 0.4 g/mm/m$^2$·24 hrs, a water absorption ratio of 2.0% or less, and an elastic modulus in tension of 5,000 MPa or more, preferably 6,000 or more, a surface of the polyimide film having been treated with reduced-pressure plasma discharge, preferably vacuum plasma discharge.

The aromatic polyimide film of the invention preferably further has a light transmission at 600 nm of 45% or more, preferably 60% or more, a linear expansion coefficient at 50–200° C. of 8 to 25 ppm/° C., and a heat shrinkage ratio at 200° C. for 2 hours of 0.1% or less.

The aromatic polyimide film of the invention preferably has a plasma discharge-treated surface having a chain of protrusions forming a network, that is, a great number of protrusions that are connected with each other in the form of network of chain.

The aromatic polyimide film of the invention is preferably made of polyimide comprising a 3,3',4,4'-biphenyltetracarboxylic acid unit, a p-phenylenediamine unit, and a 4,4'-diaminodiphenyl ether unit. More preferably, the aromatic polyimide film of the invention is composed of a high heat-resistant polyimide core layer and a couple of flexible polyimide surface layers, the core layer being placed between the polyimide surface layers, in which the high heat-resistant polyimide core layer is made of polyimide comprising a 3,3',4,4'-biphenyltetracarboxylic acid unit and a p-phenylenediamine unit, and the flexible polyimide surface layers are made of polyimide having a bendable bonding in a main skeleton thereof.

The present invention further resides in a composite sheet comprising the aromatic polyimide film of the invention and a copper layer electrolytically plated on the plasma discharge-treated surface of the film, in which a peel strength of the copper layer is 1 kgf/cm (1,000 N/m) or more and a peel strength of the copper layer after heating at 150° C. for 24 hours is 0.6 kgf/cm (600 N/m) or more.

The present invention furthermore resides in an aromatic polyimide film composed of a high heat-resistant polyimide core layer and a couple of flexible polyimide surface layers, the core layer being placed between the polyimide surface layers, in which the high heat-resistant polyimide core layer is made of polyimide comprising a 3,3',4,4'-biphenyltetracarboxylic acid unit and a p-phenylenediamine unit, and the flexible polyimide surface layers are made of polyimide having a bendable bonding in a main skeleton thereof.

The present invention furthermore resides in an electro-conductive sealing element of a packaged semi-conductor device which is composed of an aromatic polyimide film having been treated with reduced-pressure plasma discharge and a copper layer electrolytically plated on the plasma discharge-treated surface of the film, in which the polyimide film has a thickness of 20 to 60 μm, a moisture vapor transmission coefficient of 0.05 to 0.8 g/mm/m²·24 hrs, preferably 0.05 to 0.4 g/mm/m²·24 hrs, a water absorption ratio of 2.0% or less, and an elastic modulus in tension of 5,000 MPa or more, preferably 6,000 MPa or more, a surface of the polyimide film having been treated with reduced-pressure plasma discharge.

The sealing element of the invention preferably has the polyimide film which further has a light transmission at 600 nm of 45% or more, a linear expansion coefficient at 50–200° C. of 8 to 25 ppm/° C., and a heat shrinkage ratio at 200° C. for 2 hours of 0.1% or less. The sealing element preferably has a the plasma discharge-treated surface of the polyimide film having a chain of protrusions forming a network.

Preferably, the sealing element of the invention employs an aromatic polyimide film composed of a high heat-resistant polyimide core layer and a couple of flexible polyimide surface layers, the core layer being placed between the polyimide surface layers, in which the high heat-resistant polyimide core layer is made of polyimide comprising a 3,3',4,4'-biphenyltetracarboxylic acid unit and a p-phenylenediamine unit, and the flexible polyimide surface layers are made of polyimide having a bendable bonding in a main skeleton thereof.

DETAILED DESCRIPTION OF THE INVENTION

Figure 1:
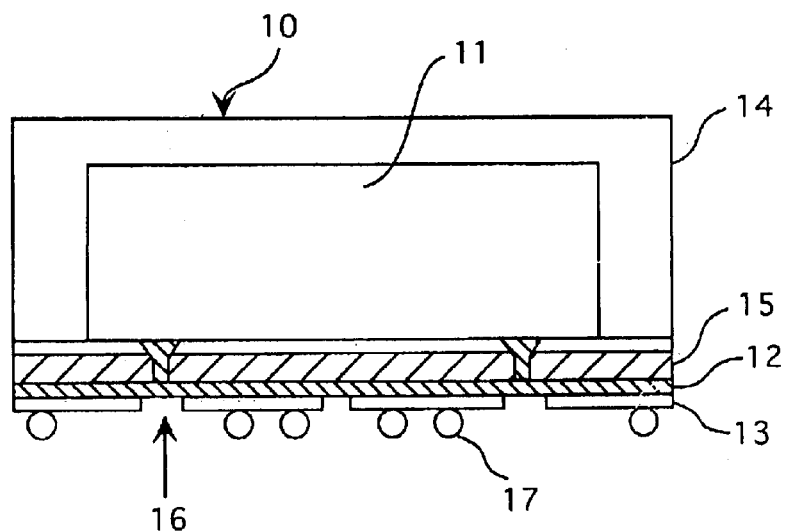
FIG. 1 shows a BGA semi-conductor device structure.

In FIG. 1, a BGA semi-conductor device structure 10 comprises a semi-conductor chip 11, an aromatic polyimide film 12 having a copper layer 13. The semi-conductor chip is sealed with a resinous material 14 having a low moisture vapor transmission. The polyimide film 12 is combined to the chip 11 and the sealing material 14 via an adhesive layer. Through-holes 16 are produced in the composite structure of the adhesive layer, the polyimide film 15, and the copper layer 12. Onto the lower surface of the copper layer 12, a solder resist layer 13 and solder balls 17 are attached.

The aromatic polyimide film employed for the preparation of the electro-conductive sealing element of the invention can be made of a single film which is made of polyimide comprising a 3,3',4,4'-biphenyltetracarboxylic acid unit, a p-phenylenediamine unit, and a 4,4'-diaminodiphenyl ether unit.

More preferably, the aromatic polyimide film is composed of a high heat-resistant polyimide core layer and a couple of flexible polyimide surface layers, the core layer being placed between the polyimide surface layers, in which the high heat-resistant polyimide core layer is made of polyimide comprising a 3,3',4,4'-biphenyltetracarboxylic acid unit and a p-phenylenediamine unit, and the flexible polyimide surface layers are made of polyimide having a bendable bonding in a main skeleton thereof. One of the surface layer can be omitted. Otherwise, One or more auxiliary layers can be placed between the core layer and the surface layer.

The multi-layer aromatic polyimide film can be preferably prepared by the steps of co-extruding a solution of a precursor of the core aromatic polyimide layer and one or two solutions of a precursor of an aromatic polyimide having bendable bondings in a molecular structure thereof to produce a combined solution films, drying the solution films at 80 to 200° C., and heating the dried films to a temperature of higher than 300° C., preferably a temperature of 300 to 550° C. The precursor solutions preferably have a viscosity of 500 to 5,000 poise.

The aromatic polyimide for the core layer comprises biphenyltetracarboxylic acid units and aromatic diamine units. The biphenyltetracarboxylic acid units preferably comprise not less than 10 mol., more preferably not less than 15 mol. %, of 3,3',4,4'-biphenyltetracarboxylic acid units. The aromatic diamine units of the core layer preferably comprise not less than 5 mol. %, more preferably not less than 15 mol. % of p-phenylenediamine units. The biphenyltetracarboxylic acid units can contain other biphenyltetracarboxylic acid units such as pyromellitic acid units. The aromatic diamine units contain other aromatic diamine units such as 4,4-diaminodiphenyl ether units.

The precursor solutions can be produced using a polar organic solvent such as an amide solvent (e.g., N,N-dimethylformamide, N,N-dimethylacetamide, N-methyl-2-pyrrolidone, or N-methylcaprolactam), dimethylsulfoxide, hexamethylphosphoramide, dimethylsulfone, tetramethylenesulfone, dimethyltetramethylenesulfone, pyridine, or ethylene glycol.

The aromatic polyimide that has bendable bondings in a molecular structure thereof and is employed for preparing the surface layer is preferably prepared from a combination of an aromatic tetracarboxylic dianhydride (or its reactive derivative) and an aromatic diamine.

The aromatic tetracarboxylic dianhydride preferably has the following formula (1):

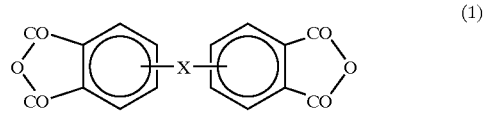

(1)

in which X is a divalent group represented by O, CO, S, SO₂, CH₂, or C(CH₃) 2 The aromatic diamine preferably has the following formula (2):

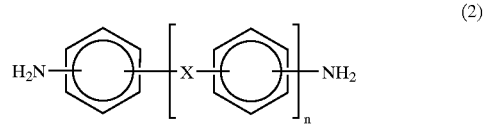

(2)

in which X is a divalent group represented by O, CO, S, SO₂, CH₂, or C(CH₃)₂, and n is 0 or an integer of 1 to 4.

The aromatic polyimide employed for preparing the surface layer should have the aromatic tetracarboxylic dianhydride of the formula (1) and/or the aromatic diamine of the formula (2).

The aromatic tetracarboxylic dianhydride of the formula (1) preferably is derived from 3,3',4,4'-benzophenonetetracarboxylic acid, 2,2-bis(3,4-dicarboxyphenyl)propane, bis(3,4-dicarboxyphenyl)methane, bis(3,4-dicarboxyphenyl)ether, bis(3,4-dicarboxyphenyl)thioether, or bis(3,4-dicarboxyphenyl)sulfone. These tetracarboxylic dianhydrides can be employed singly or in combination.

Other aromatic tetracarboxylic dianhydride derived from 3,3',4,4'-biphenyltetracarboxylic acid, 2,3,3',4- biphenyltetracarboxylic acid, or pyromellitic acid can be employed in combination with the aromatic tetracarboxylic dianhydride of the formula (1), or employed alone when the aromatic diamine of the formula (2) is employed as the aromatic diamine.

The aromatic diamine of the formula (2) preferably is a diphenyl ether diamine such as 4,4'-diaminodiphenylether or 3,3'-diaminodiphenyl ether, a diaminobenzophenone such as 3,3'-diaminobenzophenone or 4,4'-diaminobenzophenone, a diphenylalkylenediamine such as 3,3'-diaminodiphenylmethane, 3,3'-diaminodiphenylpropane, or 4,4'-diaminodiphenylpropane, a bis(aminophenoxy)benzene such as 1,3-bis(3-aminophenoxy)benzene, or a bis(aminophenoxy)biphenyl such as 4,4'-bis(3-aminophenoxy)biphenyl. These aromatic diamines can be employed singly or in combination.

Other aromatic diamines such as a diaminobenzene [e.g., 1,4-diaminobenzene (i.e., p-phenylenediamine), 1,3-diaminobenzene, or 1,2-diaminobenzene], or a benzidine compound (e.g., benzidine or 3,3'-dimethylbenzidine) can be employed in combination with the aromatic diamine of the formula (2), or alone when the aromatic tetracarboxylic dianhydride of the formula (1) is employed as the aromatic tetracarboxylic acid compound.

The aromatic polyimide film of the invention can be prepared by the following process.

The aromatic tetracarboxylic acid compound and the aromatic diamine compound are dissolved in a polar organic solvent described hereinbefore and reacted preferably at 10–80° C. for 1 to 30 hours, to give a solution containing 10–25 wt. % of a polyamic acid (imidation ratio: 5% or less) and having a rotary viscosity (30° C.) of 500 to 4,500 poise in which the polyamic acid shows a logarithmic viscosity (30° C., 0.5/100 mL in N-methyl-2-pyrrolidone) of 1 to 5.

Into a polyamic acid solution for the preparation of the core polyimide layer, an imidation catalyst such as 1,2-dimethylimidazole can be incorporated in an amount of 0.005–2 equivalents, preferably 0.005 to 0.8 equivalent, more preferably 0.02 to 0.8 equivalent, per one equivalent of the amic acid unit of the polyamic acid. A portion of the 1,2-dimethylimidazole can be replaced with imidazole, benzimidazole, N-methylimidazole, N-benzyl-2-methylimidazole, 2-methylimidazole, 2-ethyl-4-methylimidazole, 5-methylbenzimidazole, isoquinoline, 3,5-dimethylpyridine, 3,4-dimethylpyridine, 2,5-dimethylpyridine, 2,4-dimethylpyridine, or 4-n-propylpyridine.

Into the polyamic acid solution, a phosphoric compound such as an organic phosphoric compound, preferably polyphoshoric acid ester or phosphoric acid ester, or an inorganic phosphoric compound can be incorporated in an amount of 0.01 to 5 weight parts, preferably 0.01 to 3 weight parts, more preferably 0.01 to 1 weight part, per 100 weight parts of the polyamic acid.

Subsequently, into both of the polyamic acid solutions for the core layer and surface layer, or at least the polyamic acid solution for the surface layer, an inorganic filler is preferably incorporated. Examples of the inorganic fillers include silica powder, colloidal silica, silicon nitride, talc, titanium dioxide, calcium carbonate, magnesium oxide, alumina, and calcium phosphate. The inorganic filler preferably has a mean particle size of 0.005 to 0.5 $\mu$m, more preferably 0.005 to 0.2 $\mu$m. It is desired that the inorganic filler is incorporated in an amount of 0.1 to 3 weight parts per 100 weight parts of the polyamic acid.

The polyamic acid solution for core layer and the polyamic acid solution for surface layer are then supplied separately and simultaneously into a die for multiple layer extrusion to extrude continuously two or more solution layers through multiple slits (lips) onto a continuous support (in the form of belt). The continuous solution layers are dried in a casting furnace to evaporate most of the solution to give a continuous combined polyamic acid film (thickness: 30 to 100 $\mu$m). The continuous polyamic acid film is separated from the support and then heated to 350–450° C. for 2–30 minutes in a curing furnace to give a continuous combined polyimide film having a thickness of 20 to 60 $\mu$m.

The combined polyimide film of the invention should have a thickness of 20 to 60 $\mu$m, preferably 25 to 50 $\mu$m. The surface polyimide layer preferably has a thickness of 0.1 to 10 $\mu$m, more preferably a thickness of 0.2 to 5 $\mu$m.

According to the invention, one surface polyimide layer or both of the surface polyimide layers should be treated with plasma discharge under reduced pressure, preferably in vacuo, preferably to etch the surface under the condition that protrusions connected with each other in the form of network of chain are produced on at least a portion of the surface layer(s). The plasma discharge is preferably performed under reduced pressure in the presence of gas of He, Ne, Ar, Kr, Xe, $N_2$, $CF_4$, $O_2$, or a mixture of two of these gases. Ar is most preferred to produce the protrusions of the desired state. The pressure generally is in the range of 0.3 to 50 Pa, preferably 6 to 27 Pa. The temperature generally is a surrounding temperature. If desired, the temperature can be adjusted to a temperature in the range of –20° C. to 20° C.

The produced protrusions preferably have a mean surface roughness (Ra) of 0.03 to 0.1 $\mu$m, more preferably 0.04 to 0.8 $\mu$m.

As is described hereinbefore, the aromatic polyimide film of the invention should have a thickness of 20 to 60 $\mu$m, a moisture vapor transmission coefficient of 0.05 to 0.4 g/mm/$m^2 \cdot 24$ hrs, a water absorption ratio of 2.0% or less, and an elastic modulus in tension of 6,000 MPa or more. If the thickness of the polyimide film is less than 20 $\mu$m, the corresponding copper-plated film shows a low mudulus elasticity and its handling is made difficult. If the thickness is more than 60 $\mu$m, the corresponding copper-plated film is too thick to use for manufacturing a small sized semiconductor device package. If the moisture vapor transmission coefficient is less than 0.05 g/mm/$m^2 \cdot 24$ hrs, it is difficult to efficiently remove the moisture vapor from the inside of the package. If the water absorption is more than 2.0%, a large amount of moisture vapor is apt to be brought into the inside of the package. If the elastic modulus in tension is smaller than the lower limit, the polyimide film cannot satisfactorily serve as the sealing element of the package.

It is preferred that the aromatic polyimide film of the invention further has a high light-transmission, namely, a high transparency, a linear expansion coefficient of the specific range and a low heat shrinkage ratio.

The transparent polyimide film enables to facilitate the fine processing of the sealing element. Each of the appropriate linear expansion coefficient and the low heat shrinkage ration imparts to the sealing element a satisfactory dimensional stability.

On the surface of the aromatic polyimide film which has been subjected to the plasma discharge treatment under reduced pressure is placed a copper film of 4–12 $\mu$m thick directly or via an adhesive. The adhesive should be a heat-resistant adhesive such as a thermoplastic polyimide adhesive. The copper film can be electrolytically plated on the plasma discharge-treated surface of the polyimide film directly or via one or more metal-deposited film(s). The metal deposition can be performed after the plasma discharge-treated surface of the polyimide film is cleaned after being placed under atmospheric conditions by means of a plasma-cleaning treatment.

The deposited metal films are preferably composed of an underlying vacuum deposited metal film and a deposited copper top film. The metal films are also preferably composed of an underlying vacuum deposited metal film, a deposited copper intermediate film, and a plated metal top film.

The vacuum deposition can be performed by the known vacuum depositing or sputtering procedure. The vacuum depositing procedure is preferably performed at a pressure of $10^{-5}$ to 1 Pa and at a deposition rate of 5 to 500 nm/sec. The sputtering is preferably performed by the known DC magnet sputtering, at a pressure of less than 13 Pa, more preferably 0.1 to Pa, and at a deposition rate of 0.05 to 50 nm/sec.

The deposited metal films preferably have a total thickness of 10 nm to 1 $\mu$m, more preferably 0.1 to 0.5 $\mu$m. The plated metal film coated on the deposited metal film preferably has a thickness larger than that of the deposited metal film, and generally has a thickness of approx. 1 to 20 $\mu$m.

The underlying deposited metal film preferably comprises Cr, Ti, Pd, Zn, Mo, Ni, Co, Zr, Fe, or alloy of two or more of these metal elements (e.g., Ni—Cu alloy, Ni—Au alloy, and Ni—Mo alloy). The top or intermediate deposited metal film preferably comprises Cu. The plated top metal film preferably comprises Cu, Cu alloy, or Ag. Cu is preferred.

A non-electrolytically plated layer can be placed on the deposited metal film before the electrolytic metal plating is performed.

The polyimide film processed by plasma discharge can be treated to form through-holes by a mechanical process or a wet process before or after the film is covered with the metal films.

The polyimide film of the invention can have plural metal films on one side and a ceramic film or metal film on another side.

The electrolytic plating can be carried out at a temperature of 15 to 45° C. and an electric current density of 0.1 to 10 A/dm$^2$ using a plating bath containing 50–200 g/L of copper sulfate, 100–250 g/L of sulfuric acid, a small amount of a brightener and an appropriate amount of chlorine. The plating is performed under stirring with air and a transfer rate of 0.1 to 2 m/min. The negative electrode is preferably made of copper.

For the electrolytic plating, the continuous polyimide film having on its surface the deposited metal layer is preferably transferred vertically in a defatting vessel, an acid-washing vessel, a plurality of copper-plating vessels, a water-washing vessel, and a drying zone, and then wound over a roll. The plated copper layer preferably has a thickness of 1 to 20 $\mu$m. The plated copper layer produced in the vertical transfer mode favorably has abnormal protrusions (having a diameter of 15 $\mu$m or more) of a number of 200/mm$^2$ or less, more favorably 1 to 200/mm$^2$.

Thus produced continuous polyimide film having the plated copper coat is favorably employed for the preparation of a flexible printed circuit board or a TAB tape.

The invention is further described by the following examples.

In the following examples, the physical and chemical characteristics were determined by the methods described below:

Film thickness: Total thickness is measured by a contact-type thickness meter. The thickness of the surface polyimide layer and the thickness of the core polyimide layer are measured using an optical microscope.

Moisture vapor transmission coefficient: measured according to JIS K7129B.

Water absorption ratio: measured according to ASTM D570-63, 25° C.×24 hrs.

Elastic modulus in tension: measured according to ASTM D882-64T

Linear expansion coefficient: a specimen placed at 300° C. for 30 minutes for stress relaxation is attached to a TMA apparatus, and variation of the dimension in the course of temperature elevation from 50 to 200° C. at an elevation rate of 20° C./min.

Heat shrinkage ratio: measured according to ASTM D1204.

Light transmission: measured at 600 nm using PCPD-300 (available from Ohtsuka Electronics Co., Ltd.)

Appearance of film surface: observed by taking a SEM photograph (×50,000) for confirming if the protrusions of network in the form of chain are produced.

Initial peel strength: 90° peel strength of the metal films from the polyimide film which is measured at a rate of 50 mm/min (under the condition described in JIS C6471) on a sample (10 mm width) allowed to stand 24 hours after copper plating.

Heat resistance: 90° peel strength measured under the above-mentioned conditions after the film is heated to 150° C. for 24 hours in air.

COMPARISON EXAMPLE 1

(1) Preparation of Polyimide Film

In N,N-dimethylacetamide, 3,3',4,4'-biphenyltetracarboxylic dianhydride and p-phenylenediamine (1:1, molar ratio) were reacted to prepare a polyamic acid solution. The polyamic acid solution was casted on a support to give a single layer polyimide film having a thickness of. 75 $\mu$m.

(2) Surface Treatment of Polyimide Film

The polyimide film is placed in an apparatus for plasma discharge treatment. The pressure in the apparatus was reduced to less than 0.1 Pa, and Ar gas was introduced into the apparatus. Then, plasma discharge treatment of the polyimide film was carried out for 2 minutes under the conditions of Ar=100%, pressure=13.3 Pa, and power=5 kW(40 KHz).

(3) Characteristics of the Plasma Treated Polyimide Film

Moisture vapor transmission coefficient: 0.03 g/mm/m$^2$·24 hrs

Water absorption ratio: 0.1%

Elastic modulus in tension: 8,000 MPa

Tensile strength: 400 MPa

Light transmission at 600 nm: 20%

Linear expansion coefficient at 50–200° C.: 20 ppm/° C.,

Heat shrinkage ratio: 0.1%

(4) Manufacture of Semi-Conductor Device Package

To the plasma-treated surface of the polyimide film was bonded an electrolytic copper foil (thickness: 18 $\mu$m) using a thermoplastic adhesive (thickness: 12 $\mu$m), so that a TAB tape was prepared. In the course of manufacture of a semi-conductor device package according to the conventional procedure, the TAB tape was dried to reduce its water content. Thus, a semi-conductor device package of the structure illustrated in FIG. 1 was manufactured.

EXAMPLE 1

(1) Preparation of Polyimide Film

In N,N-dimethylacetamide, 3',3',4,4'-biphenyltetracarboxylic dianhydride and p-phenylenediamine (1:1, molar ratio) were reacted in the presence of 1,2-dimethylimidazole (in an amount of 2.5 wt. % per the total amount of the starting compounds), to prepare a polyamic acid solution-I for the core polyimide layer.

Independently, in N,N-dimethylacetamide, 3,3',4,4'-biphenyltetracarboxylic dianhydride, p-phenylenediamine and 4,4'-diaminodiphenyl ether (10:2:8, molar ratio) were reacted, to prepare a polyamic acid solution-II for the surface polyimide layer.

The polyamic acid solution-I and the polyamic acid solution-II were simultaneously extruded from a die having three slits, dried and heated according to the conventional manner to give a polyimide film formed of one surface polyimide layer, a core polyimide layer, and another surface polyimide layer. The polyimide film had a thickness of 25 $\mu$m (3.0 $\mu$m/19 $\mu$m/3.0 $\mu$m).

(2) Surface Treatment of Polyimide Film

The polyimide film is placed in an apparatus for plasma discharge treatment. The pressure in the apparatus was reduced to less than 0.1 Pa, and Ar gas was introduced into the apparatus. Then, plasma discharge treatment of the polyimide film was carried out for 2 minutes under the conditions of Ar=100%, pressure=13.3 Pa, and power=5 kW(40 KHz).

(3) Characteristics of the Plasma Treated Polyimide Film

Moisture vapor transmission coefficient: 0.10 g/mm/m$^2$·24 hrs

Water absorption ratio: 1.5%

Elastic modulus in tension: 7,600 MPa

Tensile strength: 500 MPa

Light transmission at 600 nm: 70%

Linear expansion coefficient at 50–200° C.: 17 ppm/° C.,

Heat shrinkage ratio: 0.08%

(4) Manufacture of Semi-Conductor Device Package

On the plasma-treated surface of the polyimide film were deposited molybdenum and subsequently copper by the conventional method. On the Mo—Cu deposited layers was electrolytically plated a copper layer having a thickness of 5 $\mu$m, so that a TAB tape was prepared. In the course of manufacture of a semi-conductor device package according to the conventional procedure, the TAB tape was dried for a period of time corresponding 50% of the drying period of time in Comparison Example 1 to reduce its water content. Thus, a semi-conductor device package of the structure illustrated in FIG. 1 was manufactured.

There was observed no trouble in the resulting semi-conductor device package.

EXAMPLE 2

(1) Preparation of Polyimide Film

A polyimide film was prepared in the manner as in Example 1-(1).

(2) Surface Treatment of Polyimide Film

The polyimide film treated by plasma discharge on its surfaces in the manner as in Example 1-(2).

(3) Surface Cleaning of Plasma Discharge-Treated Film

The plasma discharge-treated polyimide film was placed in a sputtering apparatus. The sputtering apparatus was evacuated to 2×10$^{-4}$ Pa, and Ar gas was introduced into the apparatus to give 0.67 Pa. To the electrode in contact with the polyimide film was applied an electric power of 300 W at 13.56 MHz for one minute, so that the plasma discharge-treated polyimide film was cleaned.

(4) Formation of Copper Plated Layer

The sputter-cleaned polyimide film obtained in (3) above was subsequently subjected to DC sputtering (150 W) in Ar gas atmosphere (0.67 Pa) to form subsequently Mo film (thickness 3 nm) and Cu film (thickness 300 nm), and the polyimide film having the deposited Mo—Cu layers was then taken out of the sputtering apparatus.

The polyimide film having the deposited Mo—Cu layers was then subjected to the below-described electrolytic copper plating procedure under the condition that the film was transferred vertically, to give a polyimide film having a copper-plated layer of 5 $\mu$m thick.

Plating Bath:

concentration of copper sulfate: 100 g/L;

concentration of sulfuric acid: 150 g/L;

additives: chlorine and brightener;

temperature: 23° C.

current density: 1st bath: 1 A/dm$^2$,

2nd to 4th baths: 3 A/dm$^2$;

stirring: air stirring;

rate of transfer: 0.4 m/min.

(5) Evaluation of Cu-Plated Polyimide Film

1) The surface of the Cu-plated layer was observed by metallurgical microscope (×100, 10 (objective lens)×10) in the area of 1 mm$^2$ to detect abnormal protrusions having a diameter of 15 $\mu$m or larger. The observation was repeated on different five areas to give a mean value of the number of abnormal protrusions. The mean value of the number of abnormal protrusions was 17.

2) A liquid resist (AZ8100 DB5 (23 cp) available from Clariant Corp.) was coated on the plated copper layer by a roll coater and pre-baked at 100° C., for 120 seconds to check whether troublesome surface conditions caused by the presence of abnormal protrusions were observed or not. The coating of the liquid resist was repeated to give resist coats of various thicknesses.

3) Results

Thickness of Resist Coat:

1 $\mu$m: some defective coat areas were observed.

2 $\mu$m: almost no defective coat areas were observed.

3 $\mu$m: No defective coat areas were observed.

4 $\mu$m: No defective coat areas were observed.

(4) Manufacture of Semi-Conductor Device Package

The Cu-plated polyimide film was used as a TAB tape. In the course of manufacture of a semi-conductor device package according to the conventional procedure, the TAB tape was dried for a period of time corresponding 50% of the drying period of time in Comparison Example 1 to reduce its water content. Thus, a semi-conductor device package of the structure illustrated in FIG. 1 was manufactured.

There was observed no trouble in the resulting semi-conductor device package.

What is claimed is:

1. An aromatic polyimide film for producing an electro-conductive sealing element of a packaged semi-conductor device, in which the polyimide film has a thickness of 20 to 60 $\mu$m, a moisture vapor transmission coefficient of 0.05 to 0.8 g/mm/m$^2$·24 hrs, a water absorption ratio of 2.0% or less, and an elastic modulus in tension of 5,000 MPa or more, a surface of the polyimide film having been treated with reduced-pressure plasma discharge.

2. The aromatic polyimide film of claim 1, which further has a light transmission at 600 nm of 45% or more, a linear expansion coefficient at 50200° C. 200° C. of 8 to 25 ppm/° C., and a heat shrinkage ratio at 200° C. for 2 hours of 0.1% or less.

3. The aromatic polyimide film of claim 1, in which the plasma discharge-treated surface has a chain of protrusions forming a network.

4. The aromatic polyimide film of claim 1, in which the polyimide film is made of polyimide comprising a 3,3',4,4'-biphenyltetracarboxylic acid unit, a p-phenylenediamine unit, and a 4,4'-diaminodiphenyl ether unit.

5. The aromatic polyimide film of claim 1, which is composed of a high heat-resistant polyimide core layer and a couple of flexible polyimide surface layers, the core layer being placed between the polyimide surface layers, in which the high heat-resistant polyimide core layer is made of polyimide comprising a 3,3',4,4'-biphenyltetracarboxylic acid unit and a p-phenylenediamine unit, and the flexible polyimide surface layers are made of polyimide having a bendable bonding in a main skeleton thereof.

6. The aromatic polyimide film of claim 1, in which the reduced pressure plasma discharge is vacuum plasma discharge.

7. A composite sheet comprising the aromatic polyimide film of claim 1 and a copper layer electrolytically plated on the plasma discharge-treated surface of the film, in which a peel strength of the copper layer is 1 kgf/cm or more and a peel strength of the copper layer after heating at 150° C. for 24 hours is 0.6 kgf/cm or more.

8. A composite sheet comprising the polyimide film of claim 1, an underlying metal layer comprising Cr, Ti, Pd, Zn, Mo, Ni, Co, Zr, Fe, or alloy of two or more of these metals which is deposited on the plasma discharge-treated surface of the polyimide film, an intermediate copper layer which is deposited on the underlying layer, a total thickness of the underlying layer and intermediate layer being in the range of 10 nm to 1 $\mu$m, and a top copper layer having a thickness of 1 to 20 $\mu$m which is electrolytically plated on the intermediate layer, in which large protrusions having a diameter of 15 lm or more are present on the top layer in number of at least 200 per 1 mm² and a peel strength of the copper layer is 1 kgf/cm or more and a peel strength of the copper layer after heating at 150° C. for 24 hours is 0.6 kgf/cm or more.

9. An aromatic polyimide film of claim 1 which is composed of a high heat-resistant polyimide core layer and a couple of flexible polyimide surface layers, the core layer being placed between the polyimide surface layers, in which the high heat-resistant polyimide core layer is made of polyimide comprising a 3,3',4,4'-biphenyltetracarboxylic acid unit and a p-phenylenediamine unit, and the flexible polyimide surface layers are made of polyimide having a bendable bonding in a main skeleton thereof.

10. An electro-conductive sealing element of a packaged semi-conductor device which is composed of an aromatic polyimide film having been treated with reduced-pressure plasma discharge and a copper layer electrolytically plated on the plasma discharge-treated surface of the film, in which the polyimide film has a thickness of 20 to 60 $\mu$m, a moisture vapor transmission coefficient of 0.05 to 0.8 g/mm/m²·24 hrs, a water absorption ratio of 2.0% or less, and an elastic modulus in tension of 5,000 MPa or more, a surface of the polyimide film having been treated with reduced-pressure plasma discharge.

11. The sealing element of claim 10, in which the polyimide film further has a light transmission at 600 nm of 45% or more, a linear expansion coefficient at 50–200° C. of 8 to 25 ppm/C, and a heat shrinkage ratio at 200° C. for 2 hours of 0.1% or less.

12. The sealing element of claim 10, in which the plasma discharge-treated surface of the polyimide film has a chain of protrusions forming a network.

13. The sealing element of claim 10, in which the polyimide film is composed of a high heat-resistant polyimide core layer and a couple of flexible polyimide surface layers, the core layer being placed between the polyimide surface layers, in which the high heat-resistant polyimide core layer is made of polyimide comprising a 3,3',4,4'-biphenyltetracarboxylic acid unit and a p-phenylenediamine unit, and the flexible polyimide surface layers are made of polyimide having a bendable bonding in a main skeleton thereof.

* * * * *